Aug. 10, 1965  N. SABI  3,199,793
AUTOMATIC FEED OF SUGAR CANE AT OPTIMUM RATES
TO SUGAR CANE MILLS
Filed June 27, 1963  4 Sheets-Sheet 1
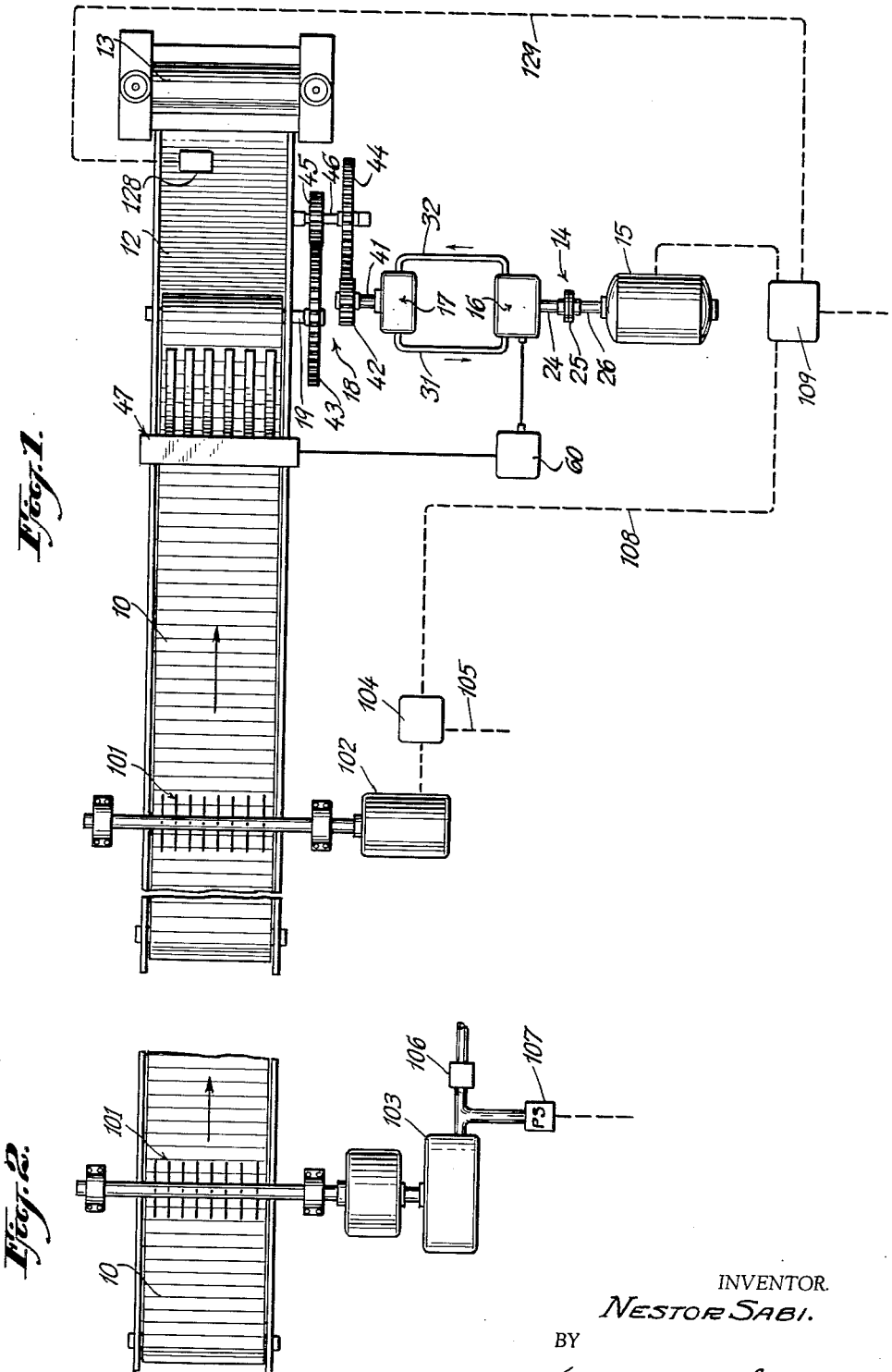
INVENTOR.
NESTOR SABI.
BY
Benjamin Sweedler
ATTORNEY.

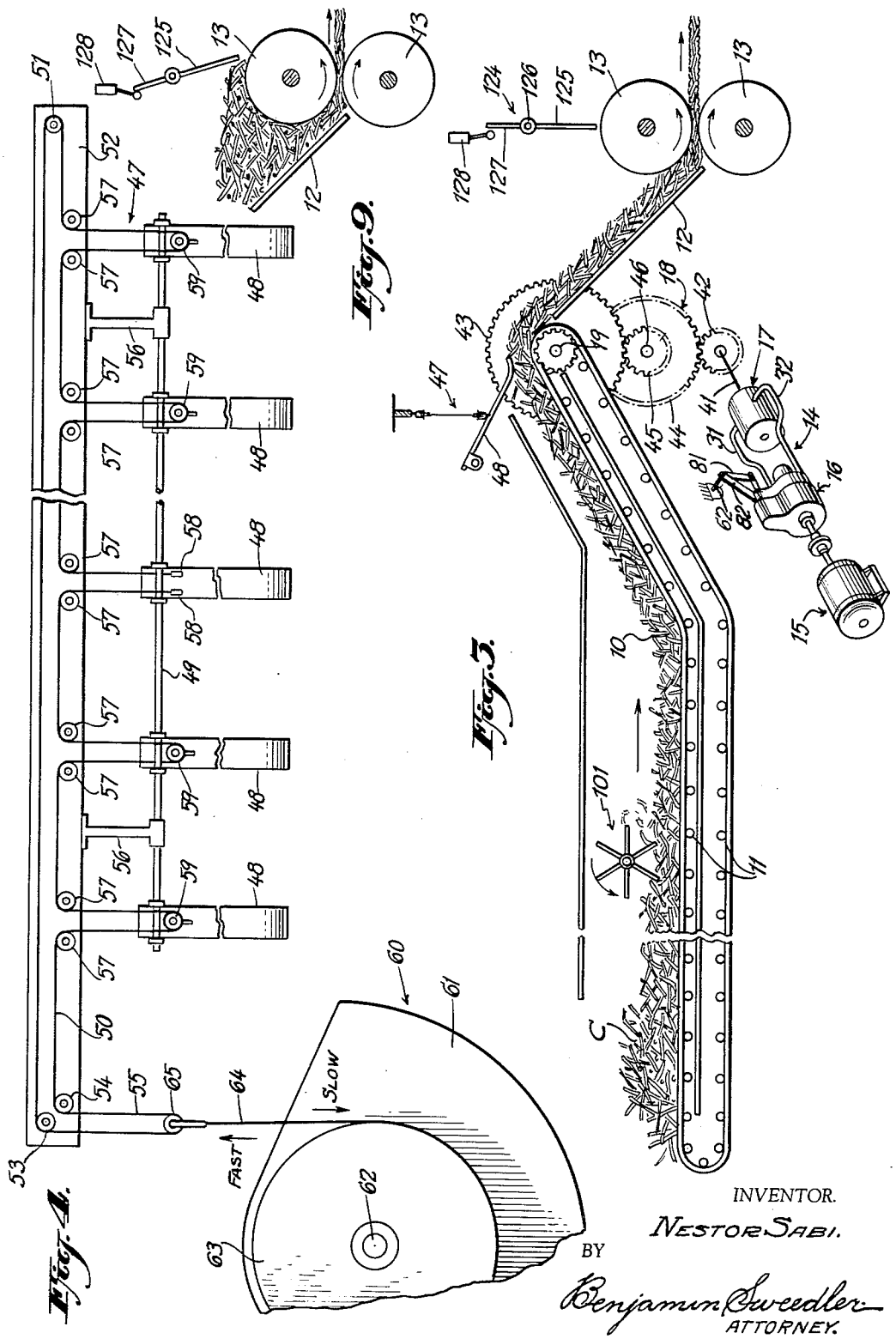

Aug. 10, 1965 N. SABI 3,199,793
AUTOMATIC FEED OF SUGAR CANE AT OPTIMUM RATES
TO SUGAR CANE MILLS
Filed June 27, 1963 4 Sheets-Sheet 3
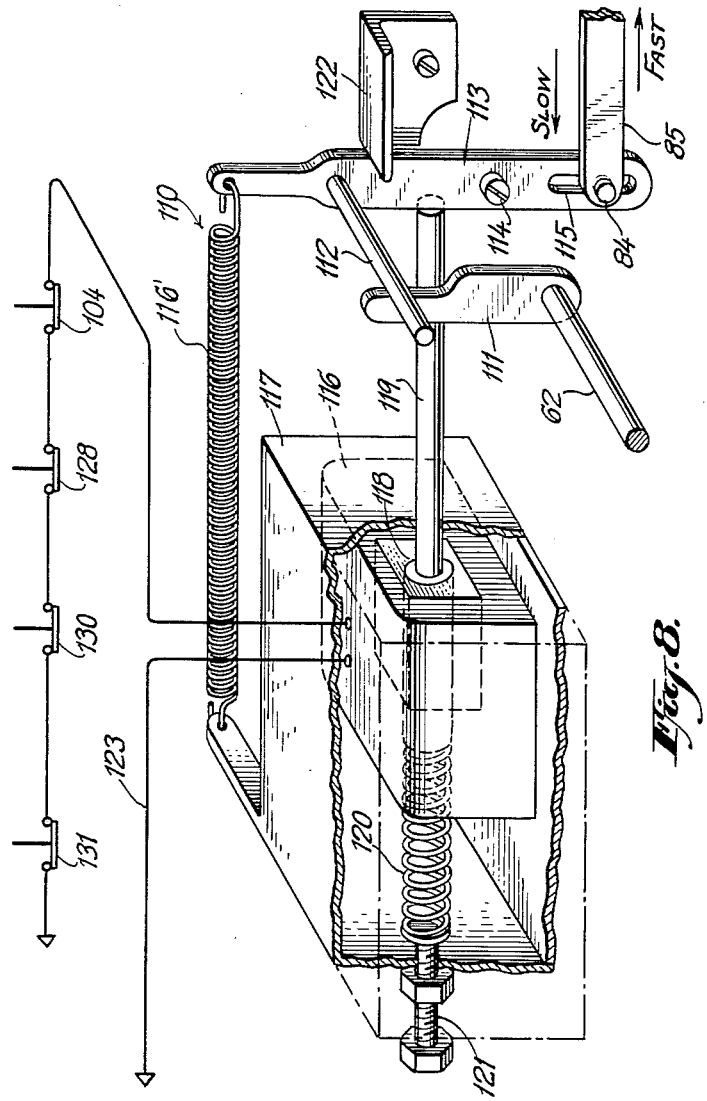
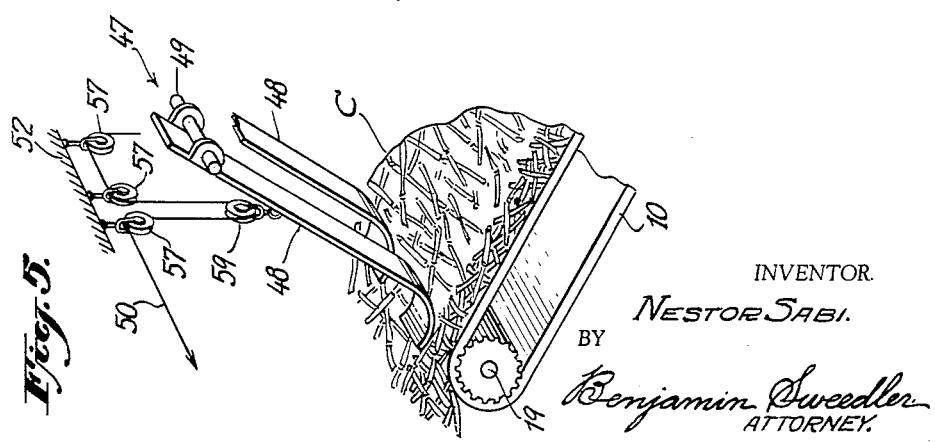
INVENTOR.
*Nestor Sabi.*
BY
*Benjamin Sweedler*
ATTORNEY.

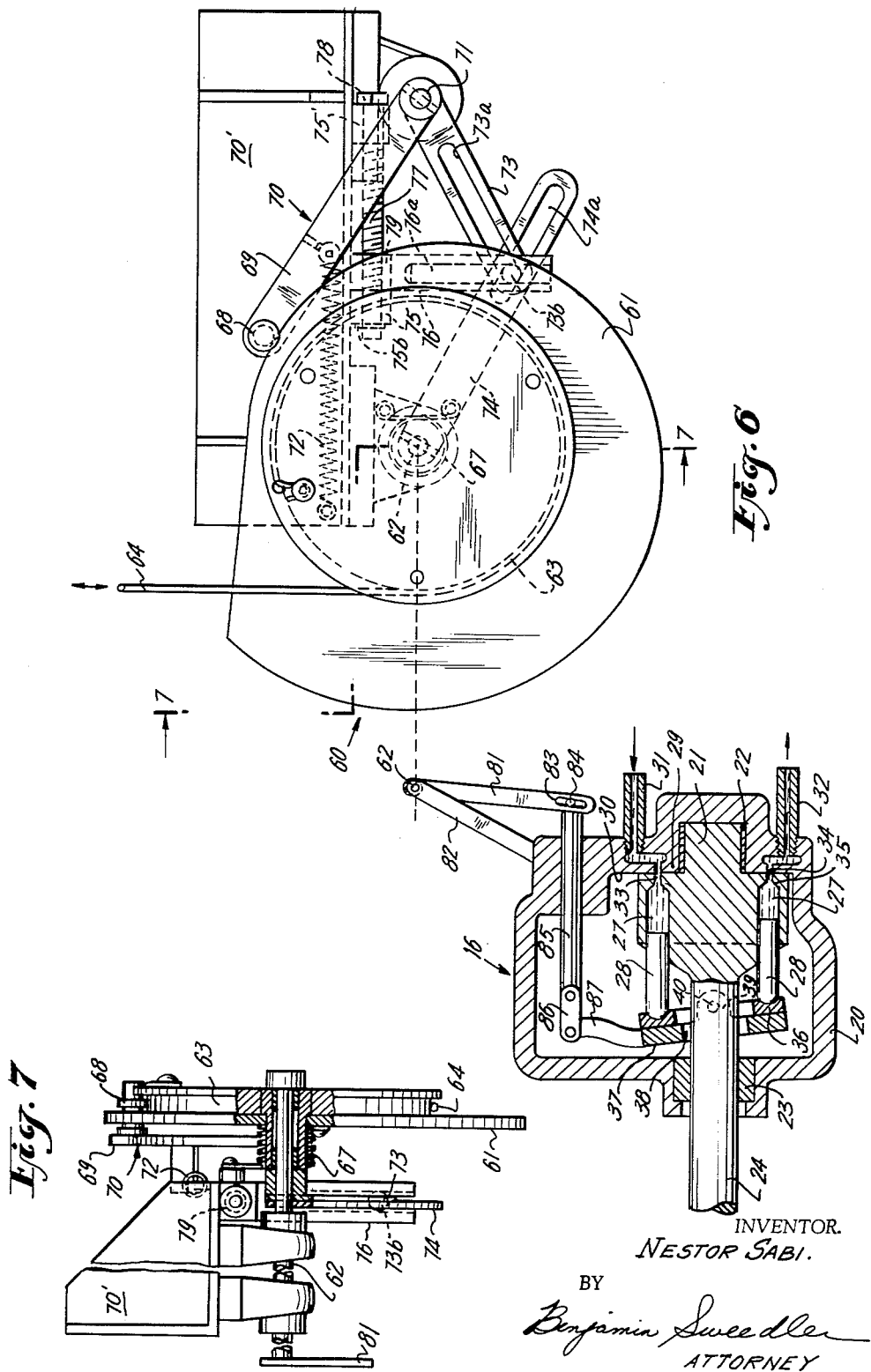

United States Patent Office 3,199,793
Patented Aug. 10, 1965

3,199,793
AUTOMATIC FEED OF SUGAR CANE AT OPTIMUM RATES TO SUGAR CANE MILLS
Nestor Sabi, New Orleans, La., assignor to Hydraulics, Inc., New Orleans, La., a corporation of Louisiana
Filed June 27, 1963, Ser. No. 291,075
19 Claims. (Cl. 241—34)

This invention relates to automatically controlled feed conveyor or conveyors for sugar cane mills.

In a sugar cane factory, the cane is delivered by an endless conveyor discharging onto an inclined chute by which the cane is fed between a first set of crushing or milling rolls, which can be followed by additional sets of rolls for expressing the juice from the cane stalks. In practice, the sugar cane is dumped from field cars or the like, or by feed tables, directly upon a conveyor so that the layer of cane transported by the conveyor is of uneven height, both in the direction of movement of the conveyor and transversely or across the conveyor. Thus, if the conveyor is driven at a uniform speed, substantial variations will occur in the volumetric rate of feeding of sugar cane to the milling or crushing rolls. The maximum volumetric rate of feed of sugar cane to the rolls will exceed the rate at which the latter can accommodate and treat the sugar cane, thereby resulting in overloading or choking of the milling or crushing rolls, while the minimum volumetric rate of feed will be less than the optimum rate at which the milling or crushing rolls can treat the sugar cane, and thereby represent ineffective utilization of the capacity of the crushing or milling rolls.

It has been suggested to drive the head shaft of the conveyor by means of a steam engine, steam turbine or electric motor, connected to the head shaft by a suitable reduction gear train, with the rate of feed of cane to the crushing or milling rolls being adjusted manually by an operator stationed near the top of the conveyor so as to have a view of the distribution of cane thereon. This operator throttles the steam supply to the drive engine, or otherwise varies the speed of the conveyor, in an attempt to achieve a more or less uniform volumetric rate of feed of sugar cane to the milling or crushing rolls. However, such manual control of the speed of the conveyor requires constant attention by the operator and cannot achieve an accurately uniform or constant optimum rate of feed. Since, as a practical matter, the manually adjusted rate of feed cannot be exactly maintained at a constant value, it is necessary for the operator to aim for a rate of feed that is somewhat below the optimum capacity of the crushing or milling rolls, thereby to avoid any danger of exceeding such rate of feed through the rolls as would result in choking of the latter.

Although it has been proposed to replace the manual control of the speed of the conveyor with a sensing mechanism which is displaced by variations in the height of sugar cane on the conveyor, and a mechanical linkage extending from the sensing mechanism to a valve for throttling the steam fed to the steam engine driving the conveyor so as to vary the speed of the conveyor in response to displacement of the sensing mechanism, such arrangements heretofore proposed for automatically controlling the feed of cane, have not achieved accurate maintenance of an optimum volumetric rate of feed.

It is a principal object of this invention to provide a novel apparatus for driving and automatically controlling the speed of the conveyor in accordance with variations in the average height of sugar cane across the conveyor at a location in advance of the chute leading to the crushing or milling rolls, which apparatus is effective to accurately maintain the volumetric rate of feed of cane to the rolls at an adjustably predetermined value, so that the accurately maintained rate of feed corresponds to the optimum or maximum rate at which the cane can be treated by the crushing rolls for most efficiently utilizing the capacity of the latter.

In accordance with this invention, the accurate maintenance of a desired constant rate of feed of cane by the conveyor is obtained by providing a drive for the conveyor that includes a constant speed prime mover, preferably an electric motor, driving a variable displacement, piston-type hydraulic pump having closed circuit connections with a piston-type, constant displacement hydraulic motor so that the motor is driven by hydraulic fluid, that is, an incompressible liquid, such as, oil or water, circulated by the pump at a speed exactly determined by the displacement of the pump, and mechanical transmission means connecting the hydraulic motor to the conveyor; sensing means responsive to changes in the average height of cane across the conveyor; and control means actuated by the sensing means and operative to vary the displacement of the hydraulic pump as an inverse function of the average height of sugar cane to which the sensing means responds.

In a preferred embodiment of the invention, the varying heights of cane across the conveyor are sensed by a device that includes a laterally arranged series of sensing fingers pivotally suspended to ride on the surface of the cane transported by the conveyor so as to assume angular positions determined by the heights of the cane across the conveyor, and a flexible filament or element, for example, in the form of a cable, running alternately about pulleys carried by an overhead frame and by the fingers and further defining a depending loop of a length that varies in accordance with the average of the angular displacement of the fingers. A cam is rotated by changes in the length of the depending loop of the flexible filament, and an adjustable mechanism is actuated by the cam to control the displacement of the pump, for example, by angularly shifting the usual slide plate thereof. Thus, when the fingers sense an increased average height of cane across the conveyor, the cam is moved to actuate the control mechanism for angularly displacing the slide plate toward its zero displacement or neutral position, whereby the displacement of the pump is reduced without requiring any change in the speed of the electric motor constituting the prime mover. Conversely, when the fingers sense a decreased average height of cane across the conveyor, the cam is moved to actuate the control mechanism for angularly displacing the slide plate toward its maximum displacement position, thus increasing the pump displacement to proportionately increase the speed of the conveyor or drive effected by the hydraulic motor. Thus the drive of the conveyor is effected by an accurately metered amount of incompressible fluid, the metering of which amount is responsive to the variations in the average height of the cane, giving unusually accurate control over the feed and permitting operation of a mill at maximum capacity while minimizing, if not preventing, chokes which require stoppage of the mill with consequent loss of output.

The above, and other objects, features and advantages of this invention, will be apparent from the following detailed description of illustrative embodiments thereof which is to be read in connection with the accompanying drawings forming a part hereof, and wherein:

FIGURE 1 is a schematic plan view of a feed conveyor for a sugar cane mill which is automatically controlled in accordance with a preferred embodiment of this invention;

FIGURE 2 is a fragmentary, schematic plan view showing a modification of the arrangement illustrated by FIGURE 1;

FIGURE 3 is a schematic side elevational view, partly in perspective, of the automatically controlled conveyor of FIGURE 1;

FIGURE 4 is a front elevational view of a device for sensing the heights of sugar cane on the conveyor;

FIGURE 5 is a fragmentary perspective view of a portion of the sensing device;

FIGURE 6 is an axial sectional view of a variable displacement hydraulic pump forming part of the conveyor drive, and an elevational view of the mechanism by which the displacement of the pump is controlled;

FIGURE 7 is an end view of the adjustable control mechanism for controlling the displacement of the pump;

FIGURE 8 is a diagrammatic perspective view, partly broken away, of an override device that is preferably included in the control for the hydraulic pump of the conveyor drive in order to permit halting of conveyor movement without interrupting operation of the electric motor of the conveyor drive; and FIGURE 9 is a fragmentary side elevational view corresponding to a portion of FIGURE 3, and illustrating the operation of a safety device for halting conveyor movement upon an excessive accumulation of sugar cane at the crushing rolls.

Referring to FIGURES 1 and 3 of the drawings, 10 is a belt or slat conveyor, of any conventional type, guided by rollers 11 so as to travel along an endless path constituted of an upper run and a lower or return run. Sugar cane stalks are dumped from field cars or the like directly upon the conveyor adjacent one end of the upper run thereof, and the conveyor delivers the cane to an inclined chute 12 which feeds the cane between a set of crushing or milling rolls 13. The illustrated rolls 13 may be followed by additional sets of milling rolls (not shown). The cane dumped on the conveyor 10 forms a layer of uneven height, particularly in the direction transversely or across the conveyor. The side of the conveyor where the cane is dumped, by the very nature of the dumping operation, usually has a greater height of cane than on the interior areas of the conveyor.

In accordance with this invention, the speed of movement of the conveyor 10 is automatically controlled in response to variations in the average height of sugar cane across the conveyor so as to accurately maintain an adjustably predetermined volumetric rate of feed of cane to the rolls 13, which rate can be the optimum and/or maximum rate for any given mill. In order to achieve such accurate control of the rate of feed of cane to the crushing or milling rolls 13, the conveyor 10 is provided with a drive identified by the reference numeral 14. This drive comprises a constant speed electric motor 15 driving a variable displacement, piston-type hydraulic pump 16 having closed circuit connections with a constant displacement, piston-type hydraulic motor 17, and a mechanical transmission 18 connecting the motor 17 to the head shaft 19 of the conveyor.

As shown particularly on FIGURE 6, the variable displacement pump 16 includes a housing 20 having a rotor 21 mounted rotatably therein in bearings 22 and 23. A shaft 24 extends from rotor 21 and is coupled, as at 25 (FIGURE 1), to the shaft 26 of motor 15 so that the rotor 21 is driven at the constant motor speed. The rotor 21 is formed with a circularly arranged series of axially extending bores 27 which define the cylinders of the pump and slidably receive pistons or plungers 28. The pistons 28 extend from the bores 27 at one side of rotor 21, and the radial face 29 at the opposite side of the rotor is pressed against the confronting end wall surface 30 of housing 20. Inlet and outlet conduits 31 and 32 are connected to passages in the end wall of housing 20 which communicate with inlet and outlet ports 33 and 34, respectively, opening at the surface 30. The ports 33 and 34 are arcuate and concentric with the axis of rotation of rotor 21 so as to alternately communicate with ports 35 extending from the bores 27 and opening at the radial face 29 of the rotor. Thus, as the rotor 21 is rotated by motor 15, each bore 27 moves along a circular path and communicates with the inlet port 33, during travel along approximately the upper half of the circular path, and with outlet port 34 during travel along the remainder of the circular path.

The ends of pistons 28 projecting from bores 27 are hemispherical and seat in correspondingly shaped sockets formed in shoes 36 which slidably engage a slide plate 37 having a central opening 38 through which shaft 24 loosely extends. The slide plate 37 has ears 39 (shown in broken lines on FIGURE 6) formed thereon at diametrically opposed locations and being mounted on pivot pins 40 carried by housing 20 so as to permit rocking of the slide plate 37 about an axis that is substantially parallel to the plane of separation between the arcuate inlet and outlet ports 33 and 34.

When slide plate 37 lies in a plane perpendicular to the axis of rotation of rotor 21, the shoes 36 merely slide against the surface of slide plate 37 during rotation of the rotor, but do not effect any axial displacement of the pistons. However, when slide plate 37 is rocked in the clockwise direction, as viewed on FIGURE 6, from the plane perpendicular to the axis of rotation of rotor 21, each piston 28 is moved in a direction out of its bore 27, to receive hydraulic fluid from the conduit 31, which hydraulic fluid is under appropriate pressure, depending upon the desired operating pressure and is constantly circulating in the circuit hereinafter described. Upon continued movement of rotor 21 each piston is driven into its bore 27 during communication of the latter with the outlet port 34, thereby to pump the hydraulic fluid through conduit 32. Thus each piston in its movement delivers an accurately metered amount of pressure fluid. It will be apparent that the length of the stroke of each piston 28 during each revolution of rotor 21 depends upon the angular displacement of slide plate 37 from the plane perpendicular to the axis of the rotor, from which it follows that the displacement of the pump 20 is exactly determined by the angular position of slide plate 37.

The piston-type hydraulic motor 17 is generally similar to the above described pump 16 with the exception that its slide plate is fixed in a position angularly displaced from the plane perpendicular to its rotor, and the inlet and outlet ports of motor 17 are connected with the conduits 32 and 31, respectively, which extend from the outlet and inlet ports 34 and 33 of pump 16. Thus, the conduits 31 and 32 constitute a closed circuit connection through which hydraulic fluid, that is, an incompressible liquid such as oil or water, is circulated between the pump and motor. By reason of the fixed angular displacement of the slide plate of motor 17, and further by reason of the incompressibility of the hydraulic fluid and the closed circuit connection between the motor and pump, the speed of rotation of the shaft 41 extending from the rotor of motor 17 always exactly corresponds to the variable displacement of pump 16.

The mechanical transmission 18 connecting the motor 17 to the head shaft 19 of conveyor 10 is shown in the form of a reduction gear train having gears 42 and 43 secured to shafts 41 and 19, respectively, and meshing with gears 44 and 45, respectively, secured on an idler shaft 46. Since the transmission 18 has a constant gear ratio, it is apparent that the rotational speed of head shaft 19, and hence the speed of movement of conveyor 10, is always exactly determined by the angular setting of the slide plate 37 of pump 16. Thus, the volumetric rate at which the cane C is fed to the crushing or milling rolls 13 may be maintained constant by suitably controlling the angular displacement of slide plate 37 in accordance with changes in the average of the height of cane across the conveyor as sensed by a device 47.

The sensing device 47 is mounted above conveyor 10 adjacent the end of the upper run of the latter, just prior to the discharge of the cane onto chute 12. Device 47 includes a laterally spaced apart series of sensing fingers 48 pivotally suspended from a transversely extending fixed rod 49 or pivoted on individual bearings. The fingers 48 slope downwardly from their pivotal mounting in the direction of movement of the conveyor so that the lower or free ends of fingers 48 ride on the surface of the layer of cane at positions spaced apart across the width of the conveyor. It is apparent that the fingers 48 independently assume angular positions about the axle 49 which correspond to the heights of cane engaged by the respective fingers. FIGURE 4 shows five fingers; the end fingers are positioned near the sides of the conveyor and the distance between adjacent fingers is approximately the same. The number and spacing of the fingers is chosen to give an accurate indication of the average height of the cane on the conveyor. The optimum number and spacing for any given installation can readily be determined by observing the disposition of the cane on the conveyor.

In order to average the heights of the cane sensed by the respective fingers 48, the device 47 includes a flexible filament 50, for example, in the form of a cable, such as a stainless steel cable, running about a pulley 51 mounted at one end of a fixed overhead frame 52, and also running about pulleys 53 and 54 at the opposite end of the overhead frame to form a loop 55 depending from pulleys 53 and 54. The rod 49 from which the fingers 48 are pivotally suspended may be carried by hangers 56 secured to the overhead frame 52. Mounted on the frame 52, above each of the fingers 48, is a pair of spaced pulleys 57. The end portions of cable 50 pass downwardly around one of the pairs of pulleys 57 and are secured to the underlying finger 48, as at 58. Each of the remaining fingers 48 has a pulley 59 secured thereto at an intermediate point between the pivot for the finger and the end of the finger around which the cable 50 is looped after passing downwardly between the pair of pulleys 57 mounted above that finger 48. It will be apparent that, in the above described sensing device 47, the length of the depending loop 55 of cable 50 always represents the average of the vertical positions of the ends of fingers 48, that is, the average of the heights of cane on the conveyor engaged by the several fingers.

Variations or changes in the length of the depending loop 55 of cable 50 control the speed of movement of conveyor 10 through control mechanism 60 which changes the angular position of the slide plate 37 of pump 16 in exact relation to the change in the length of loop 55. As shown on FIGURE 4, control mechanism 60 includes a radial cam 61 rotatable on a shaft 62 having thereon a drum 63. The cam 61 and drum 63 can be integral or suitably joined and are freely rotatable on shaft 62. A cable 64 is connected, at one end, to a pulley 65 engaging the loop 55; the other end of cable 64 is wrapped around the drum 63, in frictional engagement therewith to effect rotary movement of the drum 63 and the cam 61 proportional to the movement of drum 63 effected by the cable 64. Wound on shaft 62 is a spring 67 (FIGURE 7), one end of which is attached to the frame 70' and the other end to cam 61; this spring maintains tension on the cable 64, i.e., it produces a torque on the cam opposing that exerted by the cable 64. Any change in the length of loop 55 of cable 50, which corresponds to a change in the average of the heights of cane sensed by the several fingers 48, causes a corresponding turning movement of cam 61.

The periphery of cam 61 is engaged by a cam follower roller 68 carried by one arm 69 of a bell-crank 70 rockable on an axle 71. A spring 72 is connected to bell-crank 70 to urge the latter in the counter-clockwise direction, as viewed on FIGURE 6, and thereby maintain engagement of roller 68 with the periphery of cam 61.

The other arm 73 of bell-crank 70 has a longitudinally extending slot 73a slidably receiving a coupling sphere 73b, such as a steel ball.

A lever arm 74 has one end fixed to shaft 62 for actuation of this shaft and the other end provided with a longitudinally extending slot 74a which slidably receives the coupling sphere 73b. Shaft 62 and axle 71 are mounted in pillow blocks on frame 70', with the axis of these shafts in the same horizontal plane. An adjusting screw 77 extends parallel to a line joining the axes of shaft 62 and axle 71 and is supported at its unthreaded ends by bearings 75 and 75'. The screw 77 turns without any longitudinal displacement, being held by washer 75b and knob 78, the latter being used for manual turning. An elongated member 76 having a slot 76a therein is mounted perpendicular to the adjusting screw, the latter extending through a threaded bore 79 in the base of member 76. The upper end of member 76 is flat and slidably confronts the lower flat surface of frame 70', so that it may move laterally without turning, upon turning of the adjusting screw. Movement of member 76 along screw 77 varies the effective lever ratio of arms 73 and 74 and hence the angular motion of shaft 62 upon movement of cam 61. Since the slot 76a of member 76, which defines the path of movement of coupling sphere 73b, extends perpendicular to the line joining the axis of shaft 62 and axle 71, it will be apparent that for any setting of the member 76 along screw 77, the lever ratio of arms 73 and 74 remains constant during rocking of bell-crank 70 by cam 61. While the lever ratio of arms 73 and 74 always is constant, for any given setting of member 76, by changing the position of this member, shaft 62 is actuated more or less, depending upon the direction of movement of member 76, upon change in average height of the cane as detected by the sensing device 47. As will be explained hereinafter shaft 62 controls the displacement of pump 16 and hence that of motor 17. Accordingly, the control and adjustment mechanism hereinabove described gives an unusually accurate means for adjusting the control to give increased or decreased rate of movement of the cane conveyor to produced optimum feed of cane to the crushing rolls.

Shaft 62 is supported at one end by bracket 82 which is secured to the housing 20 of pump 16. Fixed to this end of shaft 62 is one end of a lever 81, the other end of which is formed with an elongated slot 83 slidably receiving a pin 84 at one end of a connecting rod 85 which extends slidably through the end wall of housing 20 parallel to the axis of rotor 21. The rod 85 has its inner end pivotally connected, as by a link 86, to an arm 87 projecting from the slide plate 37.

It will be apparent that, as cam follower roller 68 is engaged by portions of the periphery of cam 61 having increasing radii, bell-crank 70 is turned in the clockwise direction to rock shaft 62 and displace lever 81 thereby to angularly displace slide plate 37 from the position shown on FIGURE 6 toward a plane perpendicular to the axis of rotor 21 for decreasing the displacement of the pistons 28 of pump 16 and thus decreasing the speed of motor 17 and the speed of movement of the conveyor. Conversely, as cam follower roller 68 is engaged by peripheral portions of cam 61 having decreasing radii, slide plate 37 is moved angularly away from the plane perpendicular to the axis of rotor 21, thereby to progressively increase the displacement of the pump 16, increasing the speed of motor 17 and the speed of movement of conveyor 10. The rate of increase or decrease can be accurately adjusted by adjusting screw 77, as hereinabove disclosed.

As the length of loop 55 of cable 50 increases in response to an increase in the average of the heights of the cane across the conveyor, cam 61 is turned to present a correspondingly increased radius to roller 68, for reducing the displacement of pump 16 and that of motor 17 and hence the speed of movement of the conveyors, as explained above. On the other hand, when the fingers 48 sense a reduced average height of cane across the conveyor, and thereby shorten the loop 55, cam 61 is turned to present a decreased radius to roller 68, thereby causing a corresponding increase in the displacement of pump 16, that of motor 17 and hence in the speed of movement of conveyor 10. Thus the shape of cam 61 is such as to vary the speed of movement of the conveyor 10 as an inverse function of the average height of cane across the conveyor, as sensed by the fingers 48.

The above described control 60 employs a mechanical arrangement for angularly displacing slide plate 37 upon turning of cam 61. Instead of such mechanical arrangement, rocking movements of shaft 62 or lever 81 can be employed for actuating a hydraulic or other servo-mechanism by which angular adjustment of the slide plate 37 is effected responsive to changes in the average height of the cane on the conveyor 10 to control the feed of the cane to the chute 12, as hereinabove described.

Sugar cane mills have one or more sets of knives rotatably mounted above the conveyor, as at 101 on FIGURES 1 and 3, for the purpose of cutting the cane stalks into relatively small pieces, and thereby facilitating the treatment of the cane by the crushing or milling rolls 13. However, a heavy load of cane dumped on the conveyor may jam the rotary knives 101 and thereby create an overload condition on the conveyor drive 14 and also on the electric motor 102 (FIGURE 1) or steam turbine 103 (FIGURE 2) by which the rotary knives are driven.

In accordance with this invention, the occurrence of a heavy load of cane on the conveyor tending to jam the rotary knives 101, and consequently overloading the drives of the conveyor and knives, causes a halt in the movement of conveyor 10, thereby giving the knives a chance to cut through the accumulation of cane stalks, whereupon movement of the conveyor is automatically resumed. When the rotary knives 101 are driven by an electric motor 102, as on FIGURE 1, an overload switch 104 of any conventional type is interposed in the energizing circuit 105 of the motor 102 to halt movement of conveyor 10 upon overloading of the motor 102 driving the rotary knives.

When the knives 101 are driven by a steam turbine 103, as on FIGURE 2, jamming of the knives results in an excess pressure in the steam inlet to the turbine nozzles downstream from regulating valve 106. Steam turbines, conventionally, have a regulating valve to maintain a given speed, dictated by a governor; the pressure in the line after this valve builds up whenever there is an increased resistance to turning. Such increase in pressure can be used to actuate a pressure sensitive switch 107 (FIGURE 2) in circuit with motor 15 (FIGURE 1) to stop this motor and thus stop conveyor 10.

In one embodiment of this invention, as illustrated on FIGURE 1, switch 104 or switch 107 is in circuit through conductor 108 with a starting control 109 for the electric motor 15 of the conveyor drive 14 and causes interruption of the energizing circuit for the motor 15 to thus halt conveyor movement.

In a preferred embodiment, however, the electric motor 15 of conveyor drive 14 is continuously energized, and the actuation of switch 104 by overloading of the circuit of motor 102, or the actuation of switch 107 in response to an excess steam pressure fed to the turbine 103, causes an override device to move slide plate 37 of pump 16 to its neutral position, that is, to the plane perpendicular to the axis of rotation of rotor 21 so that, although the rotor continues to rotate at the speed of motor 15, the displacement of pump 16 is reduced to zero thereby to stop the circulation of hydraulic fluid through motor 17 and halt movement of conveyor 10.

FIGURE 8 shows this preferred embodiment. In FIGURE 8, the override device 110 halts movement of conveyor 10, as hereinafter described, without interrupting operation of the drive motor 15. In FIGURE 8, the shaft 62 actuated by the cam 61 (FIGURE 6), has fixed thereto a lever arm 111 which is engageable against a rod 112 projecting from the upper end portion of a lever 113 rockable on a pivot 114. The lower end portion of lever 113 has a slot 115 therein to receive the pin 84 for connecting the connecting rod 85 of pump 16 to the lever 113. A tension spring 116′ is connected to the upper end of lever 113 to urge the latter to rock in the counter-clockwise direction, as viewed on FIGURE 8, thereby to normally maintain engagement of rod 112 with lever 111. Thus, movements of the cam 61 resulting from changes in the average height of cane across the conveyor 10 cause angular displacement of lever 111, and such angular displacement is normally transmitted through rod 112 to lever 113 for moving the rod 85 either to increase or decrease the displacement of pump 16, and thereby either increase or decrease the displacement of motor 17 and the speed of movement of conveyor 10 for maintaining a desired optimum constant volumetric rate of feed of cane to the crushing rolls 13.

The override device 110 further includes a solenoid 116 mounted within a fixed housing 117 and having an armature 118 with a plunger 119 extending from the armature and positioned to abut against lever 113 above the pivot 114 of the latter. A helical compression spring 120 is interposed between an adjustable abutment screw 121 and the armature 118 of solenoid 116 to urge the plunger 119 in the direction toward lever 113. The coil of solenoid 116 is arranged to retract its armature 118 and thereby move plunger 119 away from lever 113 when the solenoid is energized. However, the force of spring 120 is selected so as to be substantially greater than the force of spring 116′ so that, when solenoid 116 is deenergized, spring 120 moves plunger 119 against lever 113 and overcomes the effect of spring 116′ to rock lever 113 in the direction for reducing the displacement of pump 16. A stop 122 is engageable by lever 113 to limit the angular displacement of the latter by plunger 119 to the position corresponding to zero displacement of the associated pump 16. Thus, so long as solenoid 116 is energized, the displacement of pump 16 is under the control of the cam 61, and hence is influenced by the average height of cane on the conveyor as sensed by the fingers 48. However, upon deenergization of the solenoid 116, plunger 119 is moved by spring 120 against lever 113, thus automatically reducing the displacement of pump 16 to zero, thereby halting movement of the conveyor.

In order to cause operation of the override device 110, as described above, in response to overloading of the rotary knives 101, the overload responsive switch 104, or the pressure sensitive switch 107, is interposed in the energizing circuit 123 for the solenoid 116 (FIGURE 8) and is normally closed so as to maintain energization of the solenoid. However, upon the occurrence of an overload condition, the switch 104 opens to deenergize the solenoid 116.

As an added precautionary measure, the automatically controlled drive for the conveyor 10 preferably has a safety device for halting movement of the conveyor in response to an excessive accumulation of cane at the crushing or milling rolls 13, for example, when the drive of the latter is interrupted for any reason. As shown on FIGURES 3 and 9, such safety device 124 includes an actuating lever 125 pivotally suspended from a shaft 126 so as to normally hang vertically from the latter above the top crushing or milling roll 13. A finger 127 is fixed relative to actuating lever 125 and is normally spaced from the actuating member of a normally closed switch 128 (FIGURE 3). However, as shown on FIGURE 9, when there is an excess accumulation of cane at the crushing rolls 13, for example, by reason of an interruption of the drive of the latter, the accumulated cane acts against lever 125 to rock the latter in the direction moving the finger 127 against the actuating member of switch 128, thereby to energize or deenergize a circuit.

Such actuation of switch 128 may produce an electrical signal fed through conductors 129 (FIGURE 1) to the motor control 109 for halting the operation of motor 15 of the conveyor drive, thereby to halt movement of conveyor 10. In the preferred embodiment, however, the normally closed switch 128 is interposed, in series with the switch 104, in the energizing circuit 123 of the solenoid 116 of override device 110. Thus, when the switch 128 is opened in response to an excess accumulation of cane at the crushing or milling rolls, the override device 110 acts to move the slide plate 37 of pump 16 to its zero displacement position, and thereby halt movement of the conveyor 10 while the motor 15 of the conveyor drive continues to operate.

As shown on FIGURE 8, additional switches 130 and 131 may be interposed in energizing circuit 123 in series with the previously mentioned switches 104 and 128. Such switches 130 and 131 may be manually operated from suitable locations adjacent the conveyor 10 for halting movement of the conveyor in the event of failure of the automatic controls or for any other reason.

It will be noted that the present invention provides novel apparatus for driving and automatically controlling the speed of the feed conveyor to a sugar cane mill, in accordance with variations in the average height of sugarcane across the conveyor at a location in advance of the chute leading to the crushing or press rolls of the sugar cane mill, which apparatus is effective to accurately maintain the volumetric rate of feed of cane to the crushing or press rolls at an adjustable predetermined optimum value for most efficient utilization of the capacity of the mill. Since the position of the slide plate of the pump 16 is controlled by the sensing fingers which accurately reflect changes in the avverage height of the sugar cane across the width of the conveyor thus accurately determining the pump displacement and hence accurately governing the speed of the hydraulic motor 17 which drives the conveyor, unusually accurate control of the feed of the cane to the sugar mill is attained by the present invention which thus permits operation of the mill at maximum capacity, whenever so desired, while minimizing, if not completely preventing, chokes which would require stoppage of the mill.

Although an illustrative embodiment of this invention has been described in detail herein with reference to the accompanying drawings, it is to be understood that the invention is not limited to this embodiment, and that various changes and modifications can be effected therein without departing from the scope or spirit of the invention. Accordingly this invention is not to be limited to the above description or to the showing of the drawings, except as defined in the appended claims.

What is claimed is:

1. In a crushing mill for sugar cane having a conveyor for transporting the cane to a chute discharging the cane for passage between rotated crushing rolls; the combination of
(A) sensing means responsive to changes in the average height of cane across said conveyor at a location in advance of said chute;
(B) drive means for the conveyor including a substantially constant speed prime mover, a variable displacement, piston-type hydraulic pump driven by said prime mover, a fixed displacement piston-type hydraulic motor in closed circuit connection with said pump so as to be driven by hydraulic fluid circulated by said hydraulic pump at a speed exactly determined by the displacement of said pump, and mechanical transmission means connecting said hydraulic motor to the conveyor so that the latter is driven at a linear speed corresponding to the displacement of said pump; and
(C) control means actuated by said sensing means and operative to vary the displacement of said hydraulic pump as an inverse function of the average height of cane to which said sensing means responds, thereby to accurately maintain a predetermined volumetric rate of feed of cane to the crushing rolls.

2. In a crushing mill for sugar can having a conveyor for transporting the cane to a chute discharging the cane for passage between rotated crushing rolls; the combination of
(A) a laterally spaced series of sensing fingers pivotally suspended above the conveyor to engage the cane on the latter and assume angular positions corresponding to the heights of the cane across the conveyor;
(B) a control cam;
(C) means moving said cam in accordance with changes in the average of the heights of cane sensed by said fingers and represented by the angular positions of the latter;
(D) drive means for the conveyor including a constant speed prime mover, a variable displacement, piston-type hydraulic pump driven by said prime mover, a fixed displacement piston-type hydraulic motor in closed circuit connection with said pump so as to be driven by hydraulic fluid circulated by said hydraulic pump at a speed exactly determined by the displacement of the latter, and mechanical transmission means connecting said hydraulic motor to the conveyor so that the latter is driven at a linear speed corresponding to the displacement of said pump; and
(E) means actuated by said cam and responsive to movement of the latter to vary the displacement of said pump as an inverse function of the average of the heights of the cane sensed by said fingers, thereby to accurately maintain a predetermined volumetric rate of feed of cane to the crushing rolls.

3. In a crushing mill for sugar cane having a conveyor for transporting the cane to a chute discharging the cane for passage between rotated crushing rolls; the combination of
(A) a device for sensing the average height of cane across the conveyor comprising
 (a) a laterally spaced series of sensing fingers pivotally suspended above the conveyor to engage the cane on the latter and move upwardly and downwardly in response to changes in the heights of cane engaged thereby,
 (b) an elongated flexible filament,
 (c) an overhead frame extending across the conveyor above said sensing fingers,
 (d) means connecting said filament to said frame at spaced apart locations along the latter, and
 (e) means guiding said filament between said frame and said fingers intermediate said locations along the frame so that variations in the length of said filament beyond one of said locations on the frame correspond to changes in the average of the heights of cane engaged by said fingers;
(B) a control cam;
(C) means displacing said cam in accordance with variations in said length of the filament beyond said one location on the frame;
(D) drive means for the conveyor including a constant speed prime mover, a variable displacement piston-type hydraulic pump driven by said prime mover, a fixed displacement piston-type hydraulic motor in closed circuit connection with said pump so as to be driven by hydraulic fluid circulated by said hydraulic pump at a speed exactly determined by the displacement of the latter, and mechanical transmission means connecting said hydraulic motor to the conveyor so that the latter is driven at a linear speed accurately corresponding to the displacement of said pump; and
(E) means actuated by said cam and responsive to displacement of the latter to vary the displacement of said pump as an inverse function of the average of the heights of the cane sensed by said fingers, thereby to accurately maintain a predetermined volumetric rate of feed of cane to the crushing rolls.

4. In a crushing mill for sugar cane having an endless conveyor transporting the cane to an inclined chute discharging the cane for passage between rotated crushing rolls; the combination of
(A) a laterally spaced series of sensing fingers pivotally suspended above the conveyor to engage the cane on the latter and assume angular positions corresponding to the heights of the cane across the conveyor;
(B) drive means for the conveyor including a constant speed prime mover, a piston-type hydraulic pump driven by said prime mover and having an angularly movable slide plate for varying the displacement of the pump, a fixed displacement piston-type hydraulic motor in closed circuit connection with said pump so as to be driven by hydraulic fluid circulated by said hydraulic pump at a speed exactly determined by the angular position of said slide plate of the pump, and mechanical transmission means connecting said hydraulic motor to the conveyor so that the latter is driven at a linear speed accurately corresponding to the displacement of said pump;
(C) a control cam;
(D) means displacing said cam in accordance with changes in the average of the heights of cane engaged by said fingers; and
(E) mechanical linkage means having a cam follower engaging said cam and being connected to said slide plate for angularly positioning the latter in accordance with the position of said cam.

5. In a crushing mill for sugar cane, the combination as in claim 4, wherein said means displacing the cam in accordance with changes in the average of the heights of cane enaged by said fingers includes;
(a) a fixed frame above said fingers,
(b) an elongated flexible filament having its ends secured to one of said fingers,
(c) pulleys on the remainder of said fingers and on said frame above each of said fingers,
(d) said filament running around said pulleys on the the frame and fingers to form loops therebetween having lengths that vary with changes in the heights of cane engaged by the respective fingers, and an additional loop in said filament that changes in length in accordance with changes in the average of said lengths of the loops between the frame and fingers,
(e) a drum fixed to said cam, and
(f) a cable wound on said drum and connected to said additional loop of the filament to turn the cam in response to said changes in the length of the additional loop.

6. In a crushing mill for sugar cane, the combination as in claim 4, wherein said mechanical linkage means includes;
(a) a lever means carrying said cam follower roller and including a first lever,
(b) a second lever connected to said slide plate of the pump, and
(c) adjustable means connecting said first lever with said second lever and providing means for changing the ratio between the angular movements thereof to permit adjustment of the rate of feed of cane to the crushing rolls responsive to changes in the average of the heights of the cane.

7. In a crushing mill for sugar cane, the combination as in claim 6, wherein said adjustable means connecting the first lever with the second lever includes;
(a) an elongated member extending at an angle to said levers and having an elongated slot therein,
(b) said levers each having an elongated slot therein,
(c) a coupling member disposed in said slots for movement therein thus joining said levers and said elongated member for movement relative to each other about said coupling member as a pivot, and
(d) an adjustment member for moving said elongated member and hence said coupling member to adjust the relative ratio of the effective length of said levers.

8. In a crushing mill for sugar cane, the combination as in claim 6, wherein said adjustable means connecting the first lever with the second lever includes;
(a) a first lever arm and a second lever arm having elongated slots therein and being angularly fixed with respect to each other,
(b) an elongated member having a slot extending perpendicular to a line connecting the pivoting axis of the first lever arm and the second lever arm and being movable parallel to said line, and
(c) a coupling sphere received in said slots of the first lever arm, the second lever arm and said elongated member to vary the ratio between said first lever and said rockable lever in response to movement of said elongated member.

9. In a crushing mill for sugar cane having an endless conveyor for transporting the cane to an inclined chute discharging the cane for passage between rotated crushing rolls, and rotary knives above said conveyor for cutting the cane during transport by the latter; the combination of
(A) sensing means responsive to the average height of cane across said conveyor at a location in advance of the chute;
(B) drive means for the conveyor including a constant speed prime mover, a variable displacement, piston-type hydraulic pump driven by said prime mover, a fixed displacement piston-type hydraulic motor in closed circuit connection with said pump so as to be driven by hydraulic fluid circulated by said hydraulic pump at a speed exactly determined by the displacement of the latter, and mechanical transmission means connecting said hydraulic motor to the conveyor so that the latter is driven at a linear speed accurately corresponding to the displacement of said pump;
(C) control means actuated by said means and operative to vary the displacement of said hydraulic pump as an inverse function of the average height of cane to which said sensing means responds, thereby to accurately maintain a predetermined volumetric rate of feed of cane to the crushing rolls; and
(D) means responsive to overloading of said knives to halt movement of the conveyor.

10. In a crushing mill for sugar cane, the combination as in claim 9, wherein said means for halting movement of the conveyor includes switch means operative, upon overloading of the rotary knives, to interrupt the operation of said prime mover of the conveyor drive means.

11. In a crushing mill for sugar cane, the combination as in claim 9, wherein said means for halting movement of the conveyor includes:
(a) a switch means actuated upon overloading of the rotary knives, and
(b) an override device interposed in said control means to reduce the displacement of said hydraulic pump to zero in response to actuation of said switch means.

12. In a crushing mill for sugar cane, the combination as in claim 9, wherein an electric motor drives said rotary knives and has a circuit for energizing the same, and said means for halting movement of the conveyor includes switch means interposed in said circuit and being actuated by overloading of said rotary knives.

13. In a crushing mill for sugar cane, the combination as in claim 9, wherein a steam turbine drives said rotary knives and a steam supply line having a regulating valve therein feeds steam to said turbine, and said means for halting movement of the conveyor includes pressure sensitive switch means connected with said steam supply line downstream from said regulating valve and actuated by an excess pressure in said steam supply line resulting from overloading of said rotary knives.

14. In a crushing mill for sugar cane having an endless conveyor for transporting the cane to an inclined chute discharging the cane for passage between rotated crushing rolls; the combination of
- (A) sensing means responsive to the average height of cane across said conveyor at a location in advance of the chute;
- (B) drive means for the conveyor including a constant speed electric motor, a variable displacement, piston-type hydraulic pump driven by said motor, a fixed displacement piston-type hydraulic motor in closed circuit connection with said pump so as to be driven by hydraulic fluid circulated by said hydraulic pump at a speed exactly determined by the displacement of the latter, and mechanical transmission means connecting said hydraulic motor to the conveyor so that the latter is driven at a linear speed accurately corresponding to the displacement of said pump;
- (C) control means actuated by said sensing means and operative normally to vary the displacement of said hydraulic pump as an inverse function of the average height of cane to which said sensing means responds, thereby to accurately maintain a predetermined volumetric rate of feed of cane to the crushing rolls; and
- (D) means responsive to an excess accumulation of cane at the crushing rolls to halt movement of the conveyor.

15. In a crushing mill for sugar cane having a conveyor for transporting the cane to a chute discharging the cane for passage between rotated crushing rolls; the combination of
- (A) sensing means responsive to changes in the average height of can across said conveyor at a location in advance of said chute;
- (B) drive means for the conveyor including a constant speed electric motor, a piston-type hydraulic pump driven by said motor and having an angularly movably slide plate for varying the displacement of the pump, a fixed displacement piston-type hydraulic motor in closed circuit connection with said pump so as to be driven by hydraulic fluid circulated by said hydraulic pump at a speed exactly determined by the displacement of said pump, and mechanical transmission means connecting said hydraulic motor to the conveyor so that the latter is driven at a linear speed accurately corresponding to the displacement of said pump;
- (C) a control cam connected with said sensing means so as to be actuated in response to said changes in the average height of cane across the conveyor;
- (D) mechanical linkage means for angularly moving said slide plate in response to actuation of said cam and including
    - (a) a first and second linkage portions respectively engageable with said cam and connected with said slide plate, and
    - (b) relatively weak spring means normally maintaining engagement of said first and second linkage portions for angularly positioning said slide plate in accordance with the position of said cam, thereby to maintain a predetermined rate of feed to cane to the crushing rolls; and
- (E) an override device for halting movement of the conveyor including
    - (a) a disengaging member movable against said second linkage portion to position said slide plate for zero displacement of said pump,
    - (b) relatively strong spring means acting on said disengaging member and operative to overcome the force of said relatively weak spring means,
    - (c) a solenoid operative when energized, to retract said disengaging means away from said second linkage portion against the force of said strong spring means, and
    - (d) switch means actuable to interrupt the energization of said solenoid.

16. In a crushing mill for sugar cane having a conveyor for transporting the cane to a chute discharging the cane for passage between rotated crushing rolls; the combination of
- (A) sensing means responsive to changes in the average height of cane across said conveyor at a location in advance of said chute;
- (B) drive means for the conveyor comprising
    - (a) a constant speed electric motor,
    - (b) a pump for hydraulic fluid including a rotor driven by said motor and having axial bores with pistons slidable therein, a housing containing said rotor and having inlet and outlet ports alternately communicating with said bores during rotation of said rotor, and an angularly movable slide plate acting on said pistons to axially displace each piston during rotation of the rotor through a stroke length depending upon the angular position of said slide plate, so that the displacement of said pump is dependent upon said angular position of the slide plate,
    - (c) a hydraulically operated motor including a rotor having axial bores with pistons slidable therein, a housing containing said rotor and having inlet and outlet ports alternately communicating with said bores of said rotor upon rotation of the latter, and a fixed slide plate in a plane inclined with respect to the axis of said rotor so that axial displacement of said pistons against said fixed slide plate causes turning of said rotor of the motor,
    - (d) conduits between said inlet and outlet ports of the pump and said outlet and inlet ports, respectively, of the motor so that said rotor of the motor is driven at a speed exactly determined by said displacement of the pump, and
    - (e) mechancial transmission means connecting said rotor of the motor to said conveyor for driving the latter at a speed exactly determined by said displacement of the pump; and
- (C) control means actuated by said sensing means and operative to angularly move said slide plate of the pump for varying the displacement of said hydraulic pump as an inverse function of the average height of cane to which said sensing means responds, thereby to accurately maintain a predetermined volumetric rate of feed of cane to the crushing rolls.

17. In a sugar cane mill, in combination,
- (A) a sugar cane feed conveyor;
- (B) sensing means responsive to changes in the average height of cane across said conveyor;
- (C) drive means for the conveyor including a substantially constant speed prime mover, a variable displacement, piston-type hydraulic pump driven by said prime mover, a fixed displacement piston-type hydraulic motor in closed circuit connection with said pump so as to be driven by hydraulic fluid circulated by said hydraulic pump at a speed exactly determined by the displacement of said pump, and mechanical transmission means connecting said hydraulic motor to the conveyor so that the latter is driven at a linear speed corresponding to the displacement of said pump; and
- (D) control means actuated by said sensing means and operative to vary the displacement of said hydraulic pump as an inverse function of the average height of cane to which said sensing means responds, thereby to accurately maintain a predetermined volumetric rate of feed of cane.

18. In a crushing mill for sugar cane having an endless conveyor for transporting the cane to an inclined chute discharging the cane for passage between rotated crushing rolls; the combination of (A) sensing means responsive to the average height of cane across said conveyor at a location in advance of the chute;

(B) drive means for the conveyor including a constant speed electric motor, a variable displacement, piston-type hydraulic pump driven by said motor, a fixed displacement piston-type hydraulic motor in closed circuit connection with said pump so as to be driven by hydraulic fluid circulated by said hydraulic pump at a speed exactly determined by the displacement of the latter, and mechanical transmission means connecting said hydraulic motor to the conveyor so that the latter is driven at a linear speed accurately corresponding to the displacement of said pump;

(C) control means actuated by said sensing means and operative normally to vary the displacement of said hydraulic pump as an inverse function of the average height of cane to which said sensing means responds, thereby to accurately maintain a predetermined volumetric rate of feed of cane to the crushing rolls;

(D) means responsive to an excess accumulation of cane at the crushing rolls to halt movement of the conveyor; and (E) an override device for stopping movement of said conveyor without affecting the operation of said constant speed electric motor.

19. In a crushing mill for sugar cane having an endless conveyor for transporting the cane to an inclined chute discharging the cane for passage between rotated crushing rolls, and rotary knives above said conveyor for cutting the cane during transport by the latter; the combination of (A) sensing means responsive to changes in the average height of cane across said conveyor at a location in advance of said chute;

(B) drive means for the conveyor including a constant speed electric motor, a piston-type hydraulic pump driven by said motor and having an angularly movable slide plate for varying the displacement of the pump, a fixed displacement piston-type hydraulic motor in closed circuit connection with said pump so as to be driven by hydraulic fluid circulated by said hydraulic pump at a speed exactly determined by the displacement of said pump, and mechanical transmission means connecting said hydraulic motor to the conveyor so that the latter is driven at a linear speed accurately corresponding to the displacement of said pump;

(C) a control cam connected with said sensing means so as to be actuated in response to said changes in the average height of cane across the conveyor;

(D) mechanical linkage means for angularly moving said slide plate in response to actuation of said cams;

(E) means responsive to overloading of said knives to halt movement of the conveyor;

(F) means responsive to an excess accumulation of cane at the crushing rolls to halt movement of said conveyor; and (G) an override device for overriding the action of said means responsive to overloading of said knives to halt movement of the conveyor, and said means responsive to an excess accumulation of cane at the crushing rolls to halt movement of the conveyor, said override device being constructed and arranged to position said slide plate to reduce the displacement of said hydraulic pump to zero and thus stop the drive for said conveyor while permitting the constant speed electric motor to continue to actuate said piston-type hydraulic pump.

References Cited by the Examiner

UNITED STATES PATENTS

| | | | |
|---|---|---|---|
| 2,030,448 | 2/36 | Hardgrove | 241—34 |
| 2,692,629 | 10/54 | Gardner | 146—169 X |
| 2,791,252 | 5/57 | Church | 146—117 X |
| 2,954,937 | 10/60 | Freeman. | |
| 3,010,499 | 11/61 | Dahms et al. | 146—94 |
| 3,133,571 | 5/64 | Hansgen et al. | 146—95 |

ROBERT C. RIORDON, *Primary Examiner.*

J. SPENCER OVERHOLSER, *Examiner.*